US010628906B2

(12) United States Patent
Zachary

(10) Patent No.: US 10,628,906 B2
(45) Date of Patent: Apr. 21, 2020

(54) EMBEDDING BLOCKCHAIN INFORMATION IN DIGITAL IMAGES

(71) Applicant: General Motors LLC, Detroit, MI (US)

(72) Inventor: Christopher L. Zachary, Troy, MI (US)

(73) Assignee: GENERAL MOTORS LLC, Detroit, MI (US)

(*) Notice: Subject to any disclaimer, the term of this patent is extended or adjusted under 35 U.S.C. 154(b) by 113 days.

(21) Appl. No.: 16/011,348

(22) Filed: Jun. 18, 2018

(65) Prior Publication Data
US 2019/0385269 A1 Dec. 19, 2019

(51) Int. Cl.
G06T 1/00 (2006.01)
H04L 29/08 (2006.01)
H04N 7/18 (2006.01)
G07C 5/00 (2006.01)
H04N 1/32 (2006.01)
H04W 4/46 (2018.01)
H04W 4/44 (2018.01)

(52) U.S. Cl.
CPC ............ G06T 1/0085 (2013.01); G07C 5/008 (2013.01); H04L 67/12 (2013.01); H04N 1/32283 (2013.01); H04N 7/18 (2013.01); H04W 4/44 (2018.02); H04W 4/46 (2018.02)

(58) Field of Classification Search
CPC .... G06T 1/0085; H04N 1/32283; H04N 7/18; G07C 5/008; H04L 67/12; H04W 4/46; H04W 4/44
See application file for complete search history.

(56) References Cited

U.S. PATENT DOCUMENTS

| 10,498,827 | B2* | 12/2019 | Chow | H04L 67/12 |
| 2018/0121635 | A1* | 5/2018 | Tormasov | G06F 21/645 |
| 2018/0270244 | A1* | 9/2018 | Kumar | B64C 39/024 |
| 2018/0284737 | A1* | 10/2018 | Cella | G06N 3/088 |

* cited by examiner

Primary Examiner — Neil R McLean
(74) Attorney, Agent, or Firm — Reising Ethington P.C.; David Willoughby

(57) ABSTRACT

A system and method for producing vision data that is embedded with a blockchain hash stored on a blockchain, the method including: detecting a vehicle event at a vehicle using vehicle electronics included in the vehicle; sending a vehicle event report message to a blockchain domain server in response to the detected vehicle event, the vehicle event report message including information pertaining to the detected vehicle event, and wherein the blockchain domain server is configured to record the detected vehicle event as a part of a blockchain based on the vehicle event report message; receiving a blockchain hash at the vehicle from the blockchain domain server; and embedding the blockchain hash within vision data at the vehicle using the vehicle electronics, wherein the vision data is captured by a vision sensor that is mounted on the vehicle and included as a part of the vehicle electronics.

20 Claims, 4 Drawing Sheets

EMBEDDING BLOCKCHAIN INFORMATION IN DIGITAL IMAGES

INTRODUCTION

The present invention relates to watermarking vision data captured by a vehicle.

Vehicles include hardware and software capable of obtaining and processing various information, including image capturing capabilities. The vehicle can capture image data for purposes of autonomous vehicle operation, as well as other operations. This information can be stored in various databases that are a part of the vehicle communication system.

SUMMARY

According to one aspect of the invention, there is provided a method of producing vision data that is embedded with a blockchain hash stored on a blockchain, the method including: detecting a vehicle event at a vehicle using vehicle electronics included in the vehicle; sending a vehicle event report message to a blockchain domain server in response to the detected vehicle event, the vehicle event report message including information pertaining to the detected vehicle event, and wherein the blockchain domain server is configured to record the detected vehicle event as a part of a blockchain based on the vehicle event report message; receiving a blockchain hash at the vehicle from the blockchain domain server; and embedding the blockchain hash within vision data at the vehicle using the vehicle electronics, wherein the vision data is captured by a vision sensor that is mounted on the vehicle and included as a part of the vehicle electronics.

According to various embodiments, this method may further include any one of the following features or any technically-feasible combination of some or all of these features:
- the blockchain hash is an event-specific hash that is generated at the blockchain domain server as a part of the recording of the detected vehicle event at the blockchain domain server, and wherein the blockchain hash is received in response to the recording of the detected vehicle event at the blockchain domain server;
- sending the vision data with the embedded blockchain hash to a remote facility that is separate from the blockchain domain server;
- the vehicle event report message includes a vehicle location, a timestamp, and at least one other vehicle state datum, and wherein the vehicle location, the timestamp, and the at least one other vehicle state datum correspond to a time of the detected vehicle event;
- registering the vehicle with a blockchain domain server in response to the vehicle approaching or entering a geographical domain associated with the blockchain domain server;
- the vision data is image data, and wherein the blockchain hash is applied as a watermark to the image data;
- the blockchain hash is embedded in the image data using a reversible steganography technique such that all or substantially all data represented in the image data before the watermarking is retained after the image data is watermarked with the blockchain hash;
- the image data is captured by an image sensor included as a part of the vehicle electronics, and wherein the image sensor applies the blockchain hash to the image data while encoding the image data using a codec;
- the blockchain hash is a hash that is generated by carrying out a hashing function using information included in a block of the blockchain as an input; and/or
- the blockchain domain server is configured to generate the block of the blockchain using event data received in the vehicle event report message.

According to another aspect of the invention, there is provided a method of producing vision data that is embedded with a blockchain hash stored on a blockchain, the method including: registering a vehicle with a blockchain domain server in response to the vehicle approaching or entering a geographical domain associated with the blockchain domain server; receiving a blockchain hash at the vehicle from the blockchain domain server, wherein the blockchain domain server is configured to record information received from the vehicle in a blockchain, and wherein the blockchain hash is generated by carrying out a hashing function using information included in a block to be added to the blockchain as an input; and embedding the blockchain hash in vision data captured at the vehicle using the vehicle electronics, wherein the vision data is captured by a vision sensor that is mounted on the vehicle and included as a part of the vehicle electronics.

According to various embodiments, this method may further include any one of the following features or any technically-feasible combination of some or all of these features:
- the blockchain hash is a registration hash that is associated with the registration of the vehicle and that is generated at the time of registering the vehicle;
- the blockchain domain server is configured to record vehicle registration information received from the vehicle in the blockchain, and wherein the vehicle registration information is sent by the vehicle as a part of the registering step;
- the registering step includes establishing a wireless communication connection between the vehicle and the blockchain domain server;
- the wireless communication connection is established using cellular communications; and/or
- detecting a vehicle event at the vehicle using vehicle electronics included in the vehicle, wherein the vision data is image data and the vision sensor is an image sensor, and wherein the embedding step comprises watermarking each of a number of frames of the image data with the blockchain hash and storing the frames as a video clip in response to detecting the vehicle event.

According to another aspect of the invention, there is provided a vehicle electronics system, including: a wireless communications device that includes wireless communication circuitry, a processor, and memory; and a vision sensor that includes a processor and memory; wherein the vehicle electronics system includes computer instructions that, when executed by one or more processors, cause the vehicle electronics system to: (i) detect a vehicle event at a vehicle that includes the vehicle electronics system; (ii) send a vehicle event report message to a blockchain domain server using the wireless communication circuitry, the vehicle event report message including information pertaining to the detected vehicle event, and wherein the blockchain domain server is configured to record the detected vehicle event based on the vehicle event report message as a part of a blockchain; (iii) receive a blockchain hash at the vehicle from the blockchain domain server using the wireless communication circuitry; and (iv) embed the blockchain hash within vision data at the vehicle using the vision sensor.

According to various embodiments, this vehicle electronics system may further include any one of the following features or any technically-feasible combination of some or all of these features:
- at least some of the computer instructions are executed by a vehicle system module (VSM) of the vehicle other than the vision sensor and the wireless communications device;
- the vision sensor is a camera that is configured to capture image data; and/or
- a global navigation satellite system (GNSS) that is configured to determine a vehicle location of the vehicle based on receiving a plurality of GNSS signals from a plurality of GNSS satellites, wherein the vehicle location is included as a part of the vehicle event report message.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables validation of vision data associated with a vehicle or a vehicle event through use of blockchain technology. Vision data, which can be image data (e.g., pictures, video), can be captured at a vehicle using a vision sensor, such as a camera or lidar. The vision data may then be watermarked with a blockchain hash that is registered or otherwise stored on a blockchain. The blockchain enables the blockchain hash to be securely tied to vehicle information, which can be included on the blockchain and used to generate the blockchain hash. In this way, the watermarked vision data (i.e., the vision data encoded or otherwise embedded with the blockchain hash) can be linked to certain vehicle information stored on the blockchain. In one embodiment, the vehicle information corresponds to the vehicle registering with a particular geographical domain; each geographical domain can include or be associated with a different blockchain. In another embodiment, the vehicle information corresponds to information pertaining to a detected vehicle event. After the vehicle event is detected, a blockchain domain server (which may be associated with a particular geographical domain) can generate the blockchain hash, which can be specific to the detected vehicle event. The use of the blockchain can be used to verify that the vehicle information stored on the blockchain is associated with the watermarked vision data via association of the blockchain hash.

Figure 1:
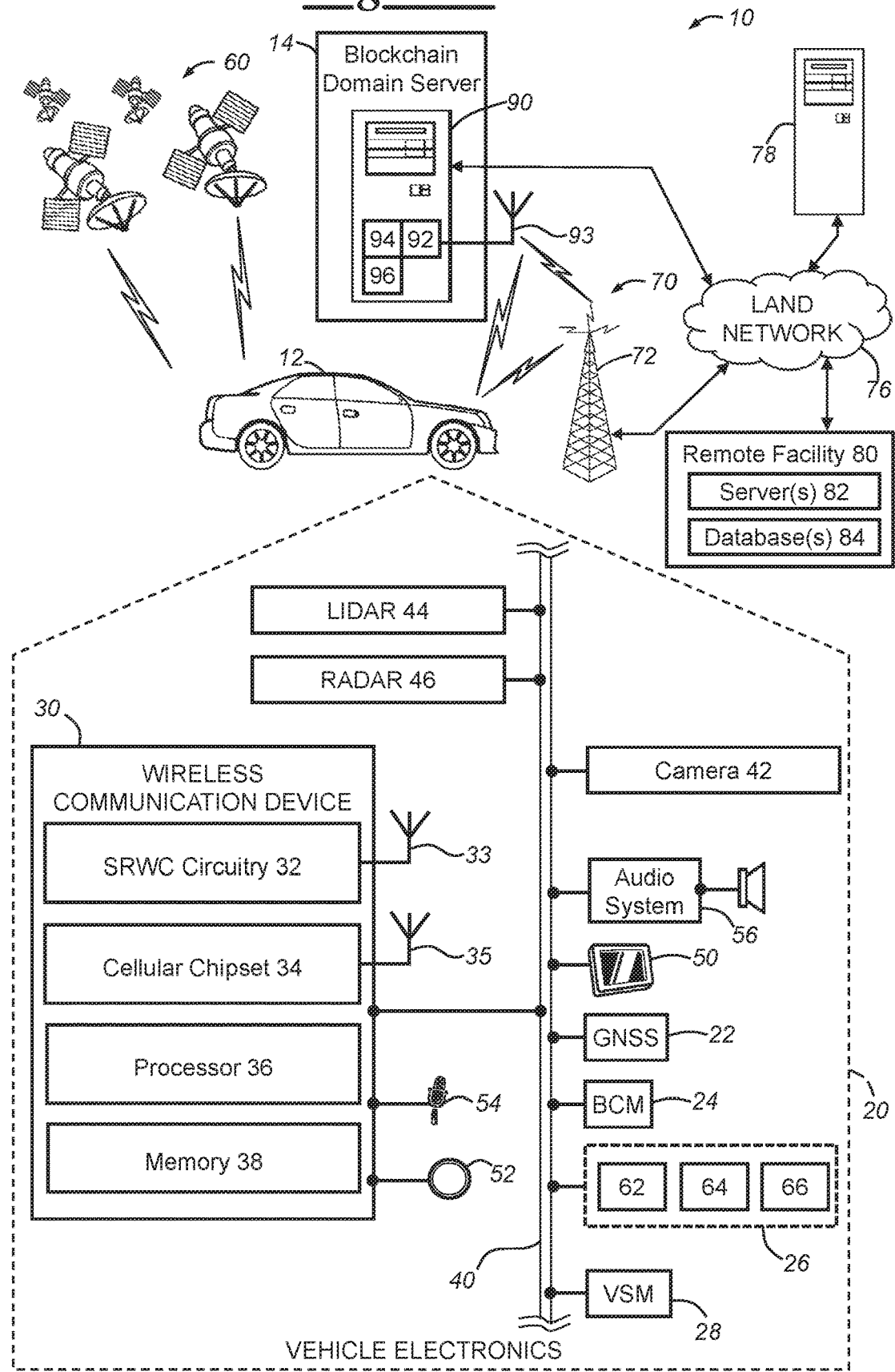
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 that includes vehicle electronics 20, a blockchain domain server 14, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, a wireless communications device 30, and vehicle-user interfaces 50-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 40 and SRWCs. The SRWCs can be carried out using the wireless communications device 30, for example.

The vehicle 12 can include numerous vehicle system modules (VSMs) as part of vehicle electronics 20, such as the GNSS receiver 22, BCM 24, ECM 26, wireless communications device 30, and vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is preferably connected by communications bus 40 to the other VSMs including the wireless communications device 30. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 60. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. The GNSS received can determine a current vehicle location based on reception of a plurality of GNSS signals from the constellation of GNSS satellites 60. The vehicle location information can then be communicated to the wireless communications device 30, or other VSM.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with or part of a center stack module (CSM) and/or integrated with wireless communications device 30. Or, the BCM may be a separate device that is connected to other VSMs via bus 40. The BCM 24 can include a processor and/or memory, which can be similar to processor 36 and memory 38 of wireless communications device 30, as discussed below. The BCM 24 may communicate with wireless device 30 and/or one or more vehicle system modules, such as the engine control module (ECM) 26, audio system 56, or other VSMs 28; in some embodiments, the BCM 24 can communicate with these modules via the communications bus 40. The BCM 24 may include a processor and memory accessible by the processor. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. In one embodiment, the BCM 24 can be used (at least in part) to detect a vehicle event based on one or more onboard vehicle sensor readings, as discussed more below.

Engine control module (ECM) 26 may control various aspects of engine operation such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM to start the vehicle—i.e., initiate the vehicle ignition or other primary propulsion system (e.g., a battery powered motor). Moreover, the ECM 26 can be used as an onboard vehicle sensor that can obtain vehicle sensor information of the vehicle engine, such as from engine speed sensor 62, engine temperature sensor 64, and engine ignition timing sensor 66, all of which are also onboard vehicle sensors. In embodiments when the vehicle is a hybrid or electric vehicle, the ECM 26 can be used to obtain status information regarding the primary mover (including electrical motor(s) and battery information). This vehicle sensor information can be sent to the BCM 24 or the wireless communications module 30 for use in detecting a vehicle event.

As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. Moreover, the powered on state can include instances in which the auxiliary electronics of the vehicle is supplied with electrical power.

Vision sensors 42-46 are each an onboard vehicle sensor, and each vision sensor 42-46 obtains vision data regarding an area within, nearby, or surrounding the vehicle 12. In at least some embodiments, the vision sensors can each be any type of sensor that obtains visual or spatial information concerning an area within or surrounding the vehicle 12. And, in many embodiments, the vision sensor can be an image sensor that captures image data regarding an area within, nearby, or surrounding the vehicle 12. The vision data obtained by the vision sensors 42-46 may be sent to another vehicle system module (VSM) such as wireless communications device 30 and/or the BCM 24 via communications bus 40. In one embodiment, the vision sensors 42-46 may each include a memory device to store the vision data and a processing device to process vision data.

The processing device of the vision sensors 42-46 can be any type of device capable of processing electronic instructions including microprocessors, microcontrollers, host processors, controllers, vehicle communication processors, and application specific integrated circuits (ASICs). The processor can be a dedicated processor used only for the vision sensor or can be shared with other vehicle system modules. Each of the processors of the vision sensors 42-46 executes various types of digitally-stored instructions, such as software or firmware programs stored in memory. Also, each of the vision sensors 42-46 include memory, which can be any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various device functions discussed herein. Also, in at least some embodiments, the vision sensors 42-46 can each include a modem for communicating information over the communications bus 40. Additionally or alternatively, in at least some embodiments, the vision sensors 42-46 can each include short-range wireless communication (SRWC) circuitry that enables the vision sensor to wirelessly communicate with one or more other SRWC devices, such as the wireless communications device 30. This SRWC circuitry can be the same or include any one or more of the features of the SRWC circuitry 32 discussed below with respect to the wireless communications device 30.

In one embodiment, any one or more of the vision sensors 42-46 includes computer instructions that, when executed, cause the processor to capture vision data and, in at least in some embodiments, compress or otherwise encode the captured vision data into a standardized or proprietary format. The compressed vision data can then be sent to other vehicle system modules (VSMs), such as the wireless communications device 30. As will be discussed below, a unique hash can be added as a watermark to, or otherwise embedded in, the captured vision data. In some embodiments, this watermarking can be done by the sensor system itself, either as part of a compression or other codec that is applied to the vision data, or separately. For this purpose, the codec used for encoding the captured vision data can include instructions in its algorithm for embedding the hash into the captured vision data. Techniques for watermarking image data as a part of its encoding algorithm are known to those skilled in the art. In other embodiments, the vision sensors 42-46 can capture raw vision data and then send the raw captured vision data to another vehicle system module that can then compress/encode the vision data and add the hash as a watermark. The vision sensors 42-46 (or other VSM performing the compression) can use any of a variety of compression techniques, including various types of lossless compression or lossy compression. For example, one or more of the vision sensors 42-46 can use run-length encoding, area image compression, DEFLATE, entropy encoding, adaptive dictionary algorithms, transform coding, fractal compression, color space reduction, etc. These may be implemented in a manner that includes watermarking of the hash into the vision data in a manner that permits later extraction of the hash for validation of the vision data, as will be discussed below. In other embodiments, the hash may be embedded into the vision data after it is compressed or otherwise processed using a codec.

In one embodiment, any one or more of the vision sensors 42-46 are configured to capture vision data upon the occurrence of receiving a command or request from another vehicle system module (VSM) to capture vision data. For example, one of the vision sensors 42-46 can receive a capture command instructing (or requesting) the vision sensor to capture vision data, which may include powering certain electronic components, switching into a capture mode, and/or other operation(s). And, in at least one embodiment, the capture command can include or be accompanied by a hash inclusion indicator that informs or instructs the vision sensor of whether to include a hash when compressing the vision data. Moreover, in such cases, the capture command can include the hash to be embedded or can be followed or preceded by a message including the hash to be embedded. For example, the capture command, the hash inclusion indicator, and the hash can be sent in the same or different messages at the same or different times. In one scenario, the hash may be sent to the vision sensor 42-46 as a part of, or in response to, registering the vehicle (or vision sensor) with the blockchain domain server 14. At this time, the vision sensor 42-46 can store the hash and, when a capture command is received, the vision sensor 42-46 can recall the hash from its memory, as well as other information that is to be embedded in the vision data or used in the capturing and/or compression processes. In other embodiments, once the vision sensor receives the hash it can automatically embed the hash into each of the frames or other pieces of vision data without needing a separate command to do so.

In at least one embodiment, the hash that is embedded in the image or other vision data comprises a watermark that may be visible or invisible (i.e., not visually perceivable or recognizable to a user viewing the image). And, the watermark (that is embedded in the vision data) may be incorporated into the vision data using alphanumeric characters (or other like characters (e.g., ASCII characters)), or may be incorporated by altering one or more properties of one or more parts (e.g., a set of adjacent pixels, individual pixels) of the vision data. For example, artificial noise can be introduced into the image data (or other vision data) in accordance with the hash. In one embodiment, the watermark can be embedded within the spatial domain (e.g., using least significant bit (LSB) watermarking techniques) or the frequency domain of the vision data. Some examples of embedding the hash within the frequency domain include using discrete wavelet transform (DWT) techniques, discrete cosine transform (DCT) techniques, and discrete Fourier transform (DFT) techniques. Also, in at least some embodiments, steganography techniques can be used for encoding the hash within the image data (or other vision data). In a particular embodiment, reversible steganography techniques can be used, which enable a user of the image data (or other vision data) to obtain both the embedded hash as well as the image (or other physical properties) represented in the original (raw or uncompressed) image. Other suitable techniques for embedding the hash within the image data (or other vision data) can be used as well. In at least one embodiment, when the image data (or other vision data) is compressed with the hash (such that the data now includes the watermark or embedded hash), the underlying (or original) image data is inseparable (or at least is intended from being inseparable) from the watermark without detection (i.e., noticing or being able to determine that the hash was removed or modified through inspecting the image data (or other vision data)).

In one embodiment, the vision sensors 42-46 capture image data (or other vision data) that is then used to inform the vehicle 12 of traffic conditions and/or other environmental information. Environmental information refers to information regarding an area surrounding or nearby the vehicle that is or can be useful in one or more vehicle operations, such as an autonomous driving operation. For example, environmental information includes roadway features, such as route or pathway information (e.g., curvature, lane width, shoulder width, number of lanes, types of lanes), roadway signage (e.g., speed limit signs, passing/no passing signs, weight limit signs, stop signs, traffic lights or other traffic signals, street signs, exit signs), weather conditions (e.g., ambient temperature, precipitation), and the like. In one embodiment, the vision sensors 42-44 (cameras 42 and/or lidar 44) can capture image data, which can then be processed using various image recognition techniques (or other processing techniques) so as to inform the vehicle 12 of traffic conditions and/or other environmental information. The vehicle 12 can then perform one or more autonomous vehicle operations based at least partly on this information, including increasing vehicle speed (e.g., by actuating a vehicle throttle), decreasing vehicle speed (e.g., using vehicle brakes), changing steering angle, etc.

Camera 42 is a vision sensor as described above and can be any suitable camera type with any suitable lens. For example, the camera 42 can be a charge coupled device (CCD), complementary metal oxide semiconductor (CMOS), or other digital camera. Camera 42 can be used to capture photographs, videos, and/or other information pertaining to visible light, which is collectively referred to herein as image data. The image data is vision data that can be represented in a pixel array or other graphical manner that conveys physical properties regarding objects within the field of view of the image sensor. In one embodiment, the image data can be video data (a plurality of sequential images) or pictures (i.e., static image data). In at least some embodiments, the image data can be captured using interlacing or progressive scanning techniques; however, other suitable techniques can be used as well. The image data can be captured at a set or at a pre-configured scanning or sampling frequency, and the camera may be configured to obtain image data of a particular resolution. Once the image data is obtained through using the camera 42, the image data can be processed and then sent to one or more other VSMs, including the wireless communications devices 30 and/or the BCM 24. The camera 42 can include processing capabilities that enable image processing techniques, including object recognition techniques, to be carried out at camera 42. Or, in other embodiments, the cameras may send raw, uncompressed, or compressed image data to another VSM, such as device 30 (or other central vehicle computer), which can then perform the image processing techniques. The vehicle 12 can include one or more cameras 42, including a back-up or reverse camera that captures image data when the vehicle is in a reverse gear or state. Any one or more of the cameras 42 can be mounted or installed on the vehicle at various locations, including the front of the vehicle, the sides of the vehicle, and/or the back of the vehicle.

Moreover, the cameras 42 can be configured or mounted in a way such that the field of view of the camera captures a particular location relative to the vehicle, such as an area behind the vehicle (rearward facing camera), an area in front of the vehicle (forward facing camera), or an area to the sides of the vehicle (sideward facing camera). In one embodiment, the camera 42 can be used to capture static images of a vehicle cabin. In another embodiment, the camera 42 can be used to capture a video stream of the roadway. And, in another embodiment, the camera 42 can capture images using a night vision feature and, in some embodiments, can be a thermographic camera used for capturing thermal images. Moreover, the image data can be used by the vehicle (or other connected systems) for a variety of functions. For example, the vehicle 12 can obtain image data from the cameras 42 and use the captured image data to obtain information regarding traffic conditions or other environmental conditions surrounding the vehicle. This traffic information (or other environmental information) can be used to inform an autonomous driving system of the vehicle, which can be implemented using one or more of the VSMs described herein.

Lidar 44 is a vision sensor as described above and, in particular, is a lidar that uses non-visible light waves to obtain spatial or other physical information regarding one or more objects within the field of view of the lidar 44. In many embodiments, the lidar 44 emits a plurality of light pulses (or pulsed laser light) and receives the reflected light pulses using a light sensor. The lidar 44 includes an emitter that emits light waves via use of a light source and can include various circuitry and/or electronic components that enable adjusting characteristics of the generated light waves or pulses. The lidar 44 can use its processor to compress the raw captured vision data and carry out other operations. Although a single lidar 44 is shown, the vehicle 12 can include one or more lidars. Moreover, the vision data captured by the lidar 44 can be image data that is represented in a pixel array (or other similar visual representation) and can thus be considered an image sensor. The lidar 44 can capture static lidar images and/or lidar image or video streams.

Radar 46 is a vision sensor as described above and, in particular, is a radar that uses radio waves to obtain spatial or other physical information regarding one or more objects within the field of view of the radar 46. The radar 46 includes a transmitter that transmits electromagnetic radio waves via use of a transmitting antenna and can include various electronic circuitry that enables the generation and modulation of an electromagnetic carrier signal. In other embodiments, the radar 46 can transmit electromagnetic waves within another frequency domain, such as the microwave domain. The radar 46 includes a signal processor, which can at least partially (e.g., fully) be implemented using the processor discussed above, or which may at least partially (e.g., fully) be implemented with dedicated circuitry. The radar 46 can include a separate receiving antenna, or the radar 46 can include a single antenna for both reception and transmission of radio signals. And, in other embodiments, the radar 46 can include a plurality of transmitting antennas, a plurality of receiving antennas, or a combination thereof so as to implement multiple input multiple output (MIMO), single input multiple output (SIMO), or multiple input single output (MISO) techniques. Although a single radar 46 is shown, the vehicle 12 can include one or more radars that can be mounted at the same or different locations of the vehicle 12.

Wireless communications device 30 is capable of communicating data via short-range wireless communications (SRWC) through use of SRWC circuit 32 and/or via cellular network communications through use of a cellular chipset 34, as depicted in the illustrated embodiment. In one embodiment, the wireless communications device 30 is a central vehicle computer that can be used to carry out various vehicle tasks. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more cellular carrier systems 70. Or, in other embodiments, a separate telematics unit can be included in the vehicle and communicatively coupled to the wireless communications device 30. The wireless communications module 30 and/or the telematics unit can be integrated with the GNSS receiver 22 so that, for example, the GNSS receiver 22 and the wireless communications device 30 (or telematics unit) are directly connected to one another as opposed to being connected via communications bus 40.

The wireless communications device 30 can be configured to communicate wirelessly according to one or more short-range wireless communications (SRWC) such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the wireless communications device 30 can be configured to communicate using IEEE 802.11p such that the vehicle can carry out vehicle-to-vehicle (V2V) communications, or vehicle-to-infrastructure (V2I) communications with infrastructure systems or devices, such as the blockchain domain server 14. And, in other embodiments, other protocols can be used for V2V or V2I communications. The short-range wireless communication (SRWC) circuitry 32 enables the wireless communications device 30 to transmit and receive SRWC signals, such as BLE signals. The SRWC circuit can allow the device 30 to connect to another SRWC device, such as the blockchain domain server 14. Additionally, in some embodiments, the wireless communications device 30 contains a cellular chipset 34 thereby allowing the device to communicate via one or more cellular protocols, such as those used by cellular carrier system 70. In such a case, the wireless communications device 30 is user equipment (UE) that can be used to in carry out cellular communications via cellular carrier system 70.

Wireless communications device 30 may enable the vehicle 12 to be in communication with one or more local (e.g., blockchain domain server 14) or remote networks (e.g., one or more networks at remote facility 80 or computers 78) via packet-switched data communication. This packet-switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server. In one embodiment, the vehicle 12 is assigned an IP address by the blockchain domain server 14 when the vehicle connects or notifies the blockchain domain server 14 of the vehicle's presence, such as through sending a wireless signal.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the wireless communications device 30 also includes a modem for communicating information over the communications bus 40.

The wireless communications device 30 can provide an interface between various VSMs of the vehicle 12 and one or more devices external to the vehicle 12, such as one or more networks or systems at remote facility 80. This enables the vehicle to communicate data or information with remote systems, such as remote facility 80. In one embodiment, the wireless communications device 30 carries out a domain registration process with the blockchain domain server 14. And, additionally, the wireless communications device 30 can detect vehicle events and send a capture command to one or more vision sensors 42-46 thereby instructing the recipient vision sensor 42-46 to capture vision data. In one embodiment, the wireless communications device 30 sends a capture command to the camera 42, as well as a sensor-specific hash, a vehicle-specific hash, a registration hash, or other hash discussed herein. The camera 42 then can compress the captured image data, which can be referred to as raw image data before compression. As a part of the compression process by the camera 42, the camera 42 can embed or include the received hash in the resulting compressed image data. This compressed image data can then be stored locally in memory of the camera 42 and/or sent to the wireless communications device 30 via the communications bus 40. In some embodiments, the wireless communications device 30 distributes one or more hashes to various VSMs of the vehicle, such as the vision sensors 42-46, during (or upon completion of) the domain registration process with the blockchain domain server 14. These hashes can then be stored by the recipient VSM in memory of the VSM. In the case of the vision sensors 42-46, these hashes can be recalled at the start of (or during) the compression process.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 40 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80 and/or blockchain domain server 14. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services, such as those used for the blockchain domain server 14. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving vehicle sensor data (e.g., image data or other vision data), as well as setting up and/or configuring subscriber preferences or controlling vehicle functions; or a vehicle telemetry data server that receives and stores data from a plurality of vehicles. A computer 78 can also be used for providing Internet connectivity such as DNS services or as a network address server that uses DHCP or other suitable protocol to assign an IP address to the vehicle 12.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend facility 80 can store various information and can include a blockchain management database and a vehicle telemetry database. The blockchain management database can store information for use in carrying out the blockchain(s) that are used by the blockchain domain servers 14. In some embodiments, a blockchain management database is not used as the blockchain domain servers 14 implement the blockchain in a distributed manner without the need for centralized services. And, in some embodiments, the blockchain management database can keep records of the various blockchain domain servers 14 and/or can include software for use by the blockchain management database. The remote server 14 can thus act to distribute software (and/or software updates) to the various blockchain domain servers 14. The vehicle telemetry database includes information received from a plurality of vehicles, such as the vehicle 12, and may be used to store image data or other vision data that is embedded with a hash. Vision data is said to be "watermarked" when the vision data is manipulated (e.g., compressed, encoded) to include an embedded hash or watermark. And, in at least some embodiments, the vision data is watermarked such that the hash is not intended to be removable from the vision data without detection.

The blockchain domain server 14 implements a blockchain that includes vision data watermarked with one or more hashes. In at least some embodiments, the vision data is captured and watermarked at a vehicle using a hash that is generated as a part of a blockchain. The watermarked image data can then be stored at a remote facility (e.g., a central database or data storage facility) and/or stored at the blockchain domain server 14. In one embodiment, the watermarked vision data is sent to the blockchain domain server 14 so that the vision data will be recorded as a part of the blockchain (e.g., within a block of the blockchain). The blockchain domain servers 14 can be distributed geographically at locations adjacent or near roadways, and can be spaced based on population or traffic density. In one embodiment, the blockchain domain server 14 can be implemented using hardware components (such as hardware 92, 94, and 96) that are shared with other systems, such as roadside units (RSUs), traffic control or monitoring systems, cellular infrastructures, personal electronic devices (e.g., smartphones, laptops, tablets, personal computers), computers 78, etc. And, in another embodiment, the blockchain domain server 14 can be implemented using dedicated hardware components that are only used for (or primarily used for) carrying out the blockchain domain server functionality discussed herein and other related functionality.

Figure 2:
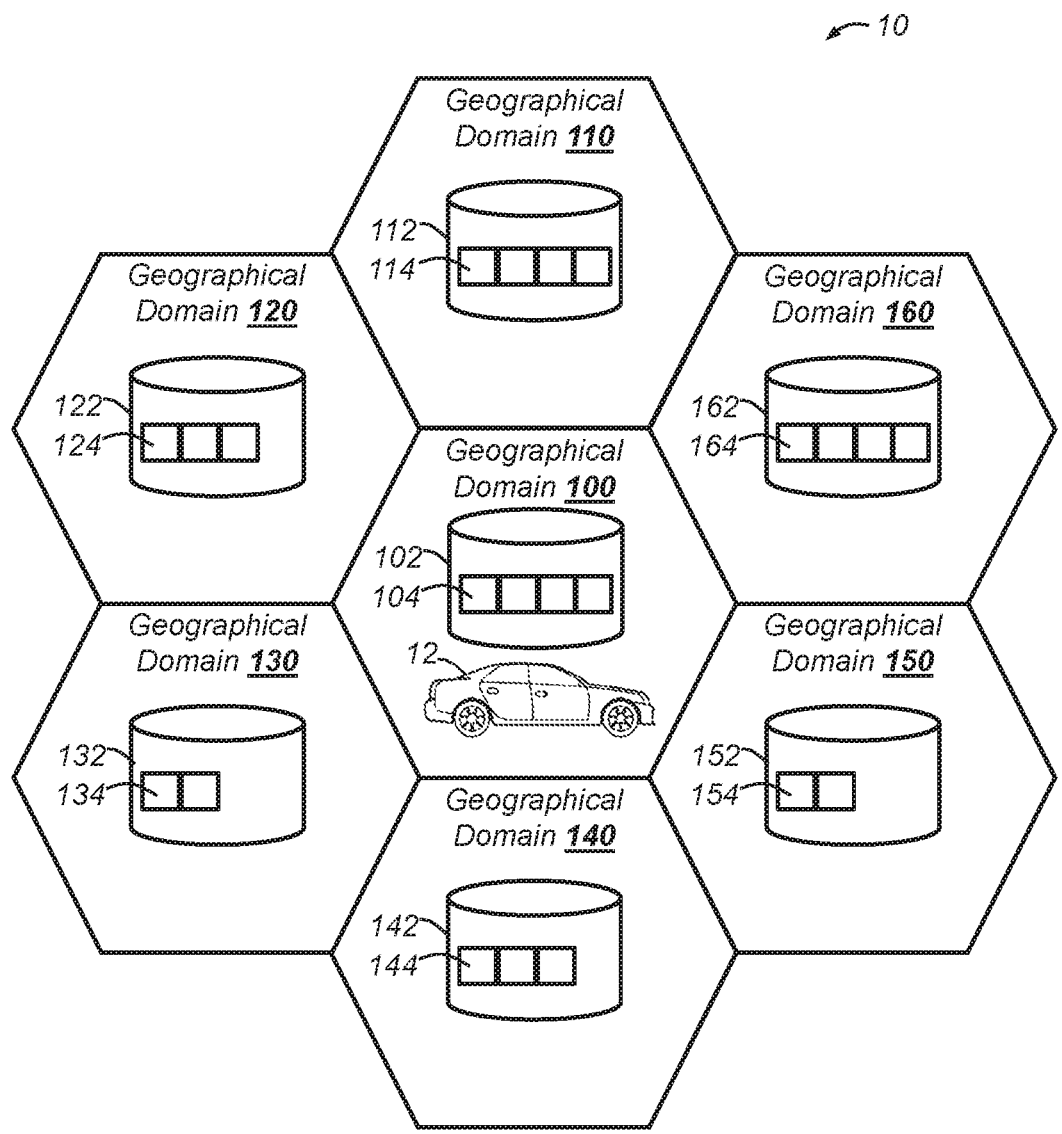
FIG. 2 is a block diagram depicting a plurality of geographical domains that may be used in conjunction with the exemplary communications system of FIG. 1.

The blockchain domain server 14 includes a wireless communications module 92, a processor 94, and memory 96. Although a single blockchain domain server 14 is depicted in the illustrated embodiment of FIG. 1, the system 10 includes a plurality of blockchain domain servers 14 (FIG. 2). The wireless communications module 92 can be used for both short-range wireless communications (SRWCs) and cellular communications, as well as other radio or wireless communications. The wireless communications module 92 can include SRWC circuitry and a cellular chipset. In other embodiments, the wireless communications module 92 can include either SRWC circuitry or a cellular chipset. The SRWC circuitry enables the wireless communications module 92 to communicate wirelessly according to one or more short-range wireless communications (SRWC) such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). And, in some embodiments, the wireless communications module 92 can be configured to communicate using IEEE 802.11p such that the blockchain domain server 14 can carry out vehicle-to-infrastructure (V2I) communications with a plurality of vehicles, such as the vehicle 12. The cellular chipset of the wireless communications module 92 enables the blockchain domain server 14 to communicate via one or more cellular protocols, such as those used by cellular carrier system 70. In such a case, the wireless communications module 92 is user equipment (UE) that can be used to in carry out cellular communications via cellular carrier system 70.

Figure 3:
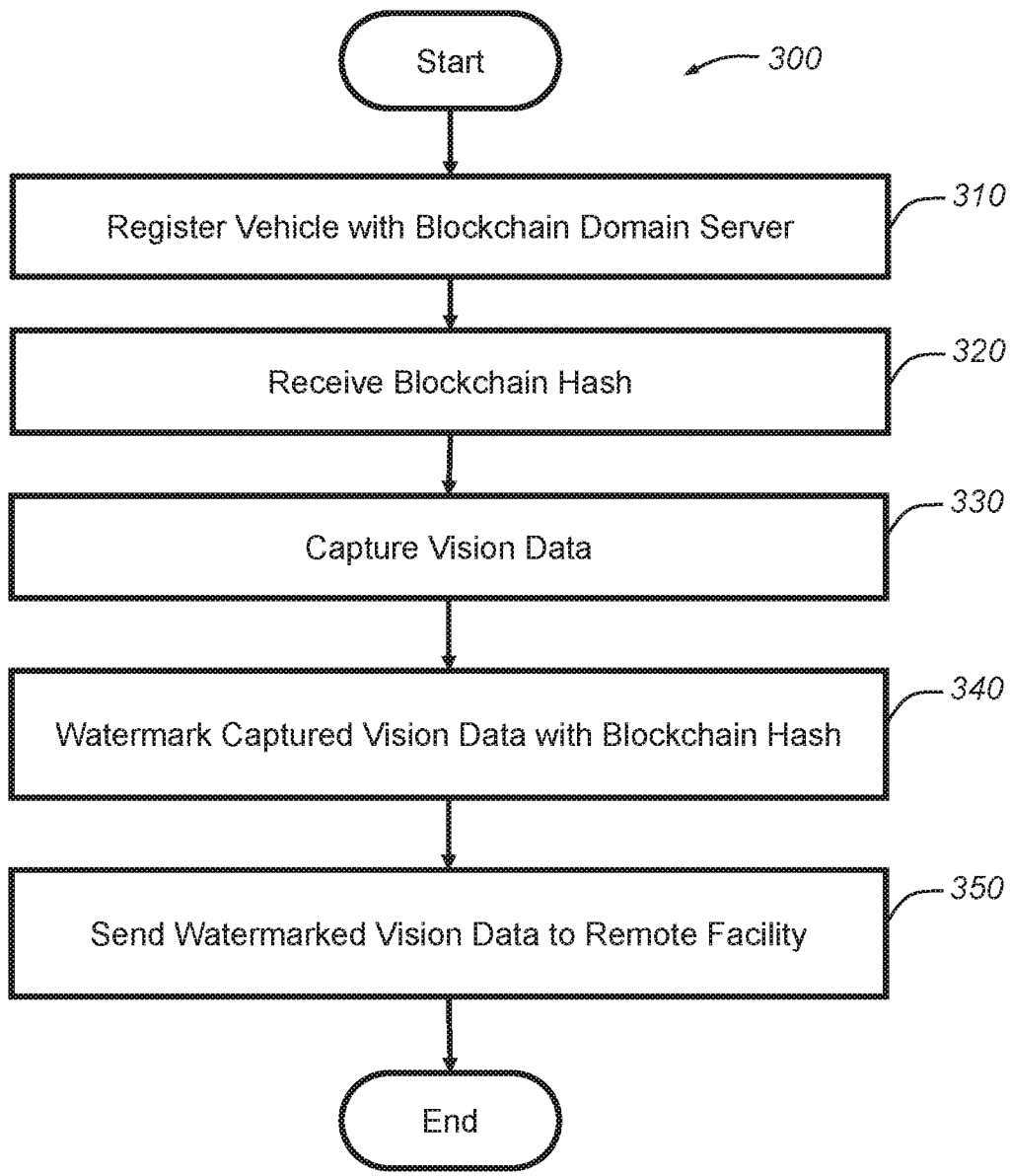
FIG. 3 is a flowchart of an embodiment of a method of producing vision data that is embedded with a blockchain hash stored on a blockchain.

The processor 94 can be any type of device capable of processing electronic instructions including microprocessors, microcontrollers, host processors, controllers, vehicle communication processors, and application specific integrated circuits (ASICs). The processors can be dedicated processors used only for the blockchain domain server 14 or can be shared with other infrastructure systems. The at least one processor can execute various types of digitally-stored instructions, such as software or firmware, which enable the blockchain domain server 14 to carry out various functionality, such as that which is described in the method below (FIG. 3). The memory 96 can be any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various device functions discussed herein.

With reference to FIG. 2, there is shown a plurality of blockchain domain servers, each of which are associated with a geographical domain 100, 110, 120, 130, 140, 150, and 160. The geographical domains can include (and/or be associated with) one or more blockchain domain servers 14 and/or one or more memory devices, such as memory 96 of the servers 14. The geographical domains 100, 110, 120, 130, 140, 150, and 160 are each associated with a single blockchain 104, 114, 124, 134, 144, 154 and 164. These blockchains are each stored in a database 102, 112, 132, 146, 152, and 162, each of which can be maintained by a blockchain domain server (e.g., server 14) on a memory device (e.g., memory 96), for example. In other embodiments, each geographical domain can be associated with numerous blockchains, or a single blockchain can be used (or associated) with a plurality of geographical domains. Each of the geographical domains 100, 110, 120, 130, 140, 150, and 160 corresponds to a geographical region or cell. The boundaries of the geographical regions can be set to a fixed size or diameter, or the sizes (or boundaries) of the geographical regions can vary based on other factors, such as population density or traffic density (density of vehicles). In one embodiment, each geographical domain includes cellular or other wireless circuitry (e.g., SRWC circuitry) to communicate with a plurality of vehicles that are presently within (or approaching) the geographical domain; this circuitry can be that of the wireless communication module 92 discussed above. And, in such an embodiment, each geographical domain can correspond to a cell of the wireless carrier system 70.

Each blockchain 104, 114, 124, 134, 144, 154 and 164 includes one or more blocks, each of which are linked in a chain-like fashion, as explained below. The blockchains can be copied and stored at a plurality of electronic devices, which can include other blockchain domain servers or other electronic devices discussed herein. For example, a copy of the blockchain can be kept (and, in some embodiments, separately verified) by various organizations or stored at various databases, including one or more OEMs, various databases of an OEM (e.g., databases 84 of various remote facilities 80), government-owned or managed databases, and other data storing entities. In one scenario, the vehicle 12 registers with a geographical domain 100 as the vehicle 12 enters the domain 100 using the blockchain domain server 14. The registration can evaluate authentication information from the vehicle 12. Once the authentication information is verified, the vehicle 12 can be trusted by the geographical domain 100 and transactions concerning the vehicle 12 can be logged using the associated blockchain 104.

Each block of the blockchain includes a blockchain header and blockchain data. The blockchain header includes a block identifier, a time indicator, a block hash, and a previous block hash. The block identifier can be any identifier that identifies an order of the block. For example, the first block of the blockchain (sometimes referred to as the "genesis block") can include a block identifier of "1" or "Block 1". The next or second block of the blockchain can then include a block identifier of "2" or "Block 2". The time indicator can be a value that identifies a particular time and date for the block, which can be a time of a vehicle event, a time in which the block was constructed, or the time at which the block was validated. In some embodiments, multiple timestamps can be included. The blocks can be validated using various techniques, such as proof of work (e.g., "mining"), proof of stake (or other consensus techniques), or other validation techniques. The block hash (i.e., a type of blockchain hash) is a hash that is generated using a hash function with the blockchain data of the block as an input. The block hash can use various hash (or hashing) functions including, for example, SHA-256 (or other SHA hash algorithms) or MD5. In many embodiments, a cryptographic hash function or a one-way hash function is used. And, in some embodiments, the blockchain data can be hashed using various techniques, such as using a Merkle tree (or hash tree). In one embodiment, each block is associated with a single blockchain transaction and corresponding vehicle event. In other embodiments, each block can include a plurality of blockchain transactions, each of which can be hashed and then combined (using one or more parent hashes) to form the blockchain hash (or root hash). The previous blockchain hash is the blockchain hash of the previous block in the blockchain. For example, the previous blockchain hash for the second block ("Block 2") is the blockchain hash of the first block ("Block 1").

The blockchain data of each block can include one or more blockchain transactions. Each blockchain transaction is associated with a single vehicle event; however, in other embodiments each blockchain transaction can be associated with one or more vehicle events, or a plurality of vehicle events. A vehicle event can be any detectable vehicle condition (or set of vehicle conditions) and the detection of the vehicle event can be associated with a predefined trigger. Each blockchain transaction can include a vehicle identifier and event data. The vehicle event data may include vehicle state information, a vehicle event type (e.g., vehicle event type identifier), a vehicle event identifier (i.e., an identifier uniquely identifying the vehicle event), one or more vision sensor identifiers (i.e., identifiers which each can be used to uniquely identify the vision sensor that is to capture vision data or that is to watermark vision data), and various other information. The vehicle identifier can be a vehicle identification number (VIN), an identifier of the wireless communications device 30 (e.g., a cellular subscriber identifier, a Bluetooth™ address (BD ADDR), an International Mobile Equipment Identity (IMEI) number), or other information that can be used to uniquely identify the vehicle 12. The vehicle state information can be one or more vehicle sensor readings or data from one or more onboard vehicle sensors of the vehicle 12, such as a collision sensor, vision sensors 42-46, engine speed sensor 62, engine temperature sensor 64, engine ignition timing sensor 66, wheel speed sensor, GNSS receiver 22, touchscreen display 50, pushbutton 52, and/or microphone 54. Also, the vehicle state information can include (either additionally or alternatively) information from wireless communication device 30, BCM 24, or other VSMs 28. The vehicle state information can include environmental information, such as traffic information or roadway information. In one embodiment, the vehicle state information included in the blockchain data includes a vehicle location and at least one other vehicle state information datum. The vehicle location can be determined by the vehicle using GNSS receiver 22, or through use of other location services.

The blockchain domain server 14 can receive vehicle event data from a plurality of vehicles, such as vehicle 12. Once the blockchain domain server 14 receives the vehicle event data, the blockchain domain server 14 can record the vehicle event in the blockchain database, such as the blockchain database 102. This recording can include creating a new block to be added to the blockchain 104, which includes generating a hash of the blockchain data as well as obtaining a previous blockchain hash. This block hash is thus specific to the vehicle event since the hash is generated based on the vehicle event data (or the vehicle state information which includes at least some of the vehicle event data); this hash can be referred to as an event-specific blockchain hash. The event-specific blockchain hash can then be communicated back to the vehicle 12 and used by the vehicle 12 when compressing vision data, such as when compressing image data obtained by cameras 42 or lidar 44.

With reference to FIG. 3, there is shown an embodiment of a method 300 of producing vision data that is embedded with a blockchain hash stored on a blockchain. In at least one embodiment, the method 300 is carried out by the vehicle 12. Although the steps of the method 300 are described as being carried out in a particular order, it is hereby contemplated that the steps of the method 300 can be carried out in any suitable or technically feasible order as will be appreciated by those skilled in the art.

In step 310, the vehicle registers as a part of a geographical domain. In one embodiment, the vehicle 12 registers with the blockchain domain server 14 of the geographical domain 100. In at least one embodiment, the registration of the vehicle 12 with the navigation domain can include the vehicle 12 establishing a connection with the blockchain domain server 14, sending registration information to the blockchain domain server 14, receiving one or more hashes from the blockchain domain server 14 in response to a successful registration of the vehicle on the blockchain 104, and storing the received hashes at one or more VSMs of the vehicle 12 (e.g., wireless communications device 30, one or more vision sensors 42-46).

First, in at least some embodiments, when the vehicle 12 enters the geographical domain 100, the vehicle 12 can connect to the blockchain domain server 14 that is associated with the geographical domain 100. In one embodiment, the vehicle 12 can use cellular communications to communicate with the wireless communications module 92 of the blockchain domain server 14, which may include use of a cell tower or other hardware that is a part of the wireless carrier system 70. In other embodiments, the vehicle 12 can use short-range wireless communications (SRWCs) to establish a wireless communication connection with the blockchain domain server 14. The vehicle 12 and the blockchain domain server 14 can establish a secure connection using a handshake, such as a four-way handshake. Connection information can be stored at the vehicle 12 and/or the blockchain domain server 14 as a part of establishing the connection or after the connection has been established.

In at least some embodiments, the vehicle sends registration information to the blockchain domain server 14. The registration information can include a unique vehicle identifier (e.g., a VIN, IMEI of the communications device 30), a password or other secret information (e.g., a digital certificate or other authentication information), vehicle state information (e.g., vehicle location), and/or various other information. In one embodiment, the registration information can specify one or more previous geographical domains that the vehicle 12 was within or registered with. The blockchain domain server 14 can then verify the vehicle credential information (e.g., vehicle identifier (or username), password or digital certificate) with information stored at database 102 or information received from remote facility 80 via land network 76 (and/or wireless carrier system 70). Once verified, the blockchain domain server 14 can create a new transaction entry (that is a part of a block) or a new block to be added to the blockchain 104. The block, once ready for introduction into the blockchain, can be hashed using one or more hashing functions (e.g., SHA-256, MD5) and appended to the end of the blockchain. Then, one or more verification processes (e.g., proof of work, proof of stake) can be used to validate the introduction of the block onto the blockchain 104. In one embodiment, this verification can be carried out by a plurality of blockchain domain servers 14 that are a part of the geographical domain 100, by a plurality of other devices that are a part of the geographical domain 100, or by a plurality of other computing devices that include a copy of the blockchain 104. The method 300 continues to step 320.

In step 320, the vehicle receives a blockchain hash from the blockchain domain server. As mentioned, after successful verification of the vehicle credential information (and/or other registration information), the blockchain domain server 14 can generate one or more hashes. In one embodiment, a single hash (or registration hash) is generated and corresponds to the vehicle registration with the geographical domain 100. Once the vehicle 12 receives the blockchain hash from the blockchain domain server 14, the vehicle 12 stores the hash into memory. In one embodiment, the vehicle 12 can store the hash into the memory 38 of the wireless communications devices 30. Additionally, or alternatively, the vehicle 12 can send the hash to other VSMs, such as the vision sensors 42-46. The other VSMs can then store the hash in a memory device, such as in one or more memory devices of cameras 42 or lidar 44. The method 300 continues to step 330.

In step 330, the vehicle captures vision data. In one embodiment, the vehicle 12 captures vision data in response to the detection of a vehicle event. In other embodiments, the vehicle 12 is already capturing vision data when (and prior to) the detection of the vehicle event. In a particular embodiment where the vehicle 12 is already capturing vision data when (and prior to) the detection of the vehicle event, the vehicle 12 can then determine to store and/or retain certain captured vision data in response to the detection of the vehicle event. For example, in one embodiment, the vehicle 12 captures image data (or other vision data) prior to the detected vehicle event, but only keeps this captured image data (or other vision data) in memory for a predetermined amount of time (e.g., five minutes), after which the image data is deleted so as to free up space of the memory device. However, after the detection of the vehicle event, the vehicle 12 can determine to retain this temporarily stored image data (or other vision data) and other image data (or other vision data) that is to be captured after the detection of the vehicle event.

In one embodiment, the wireless communications device 30 (or other VSM, such as a VSM that detected the vehicle event) can send a capture command to one or more of the vision sensors 42-46, which informs the vision sensor to capture vision data (or retain vision data, as described above). This capture command can be generated and/or sent to the vision sensors in response to the detection of the vehicle event. The capture command can include the registration hash, or may indicate one or more of the hashes to be included within the image data or other vision data. In one embodiment, the detected vehicle event may be associated with certain vision sensors 42-46 and, in this case, a capture command is only sent to those associated vision sensors. The method 300 continues to step 340.

In step 340, the captured vision data is embedded with the blockchain hash. In one embodiment, the blockchain hash is the registration hash. The captured vision data can be the vision data that was captured in response to the capture command, and/or the data that was retained in response to the capture command. In many embodiments, this captured vision data exists in an uncompressed or "raw" state before the compression of step 340 is carried out. The raw vision data refers to vision data that is captured by the vision sensor and that is unprocessed or minimally processed by the image sensor; for example, raw image data refers to image data in its raw state and can be included in a raw image file. The hash can be included in the captured vision data using a watermarking technique, such as those discussed above. In one embodiment, this watermarking technique can be carried out as a part of compressing or otherwise encoding the raw vision data into encoded vision data. In other embodiments, the captured vision data can be compressed/encoded before step 340 and, during step 340, the one or more hashes are embedded in the encoded vision data using the one or more watermarking or steganography techniques (or other watermarking techniques). As mentioned above, the vision sensor 42-46 that captures the vision data can encode the vision data, or the vision data can be encoded and/or watermarked by another VSM, such as the wireless communications device 30. In one embodiment, the encoding can be carried out as the vision data is being captured or can include: recalling the vision data from memory (such as a memory device of the camera 42), encoding the recalled vision data, and then watermarking the vision data. In other embodiments, the encoding step and the watermarking step are integrated watermark-encoding technique. In another embodiment, a watermarking technique can be carried out on the raw data and a compression technique can be carried out on the watermarked data—in such embodiments, a lossless compression technique may be employed.

Any one or more of those techniques discussed above with respect to the vision sensors 42-46 can be used to watermark the vision data with the blockchain hash. In some embodiments, the vision sensors 42-46 can embed a plurality of the hashes within the vision data. The method 300 continues to step 350.

In step 350, the watermarked vision data is sent to the remote facility. In one embodiment, the watermarked vision data is sent to the remote facility via wireless carrier system 70 and land network 76 directly—that is, the watermarked vision data is sent to the remote facility without being communicated through the blockchain domain server 14. In another embodiment, the watermarked vision data is sent to the remote facility via the blockchain domain server 14.

And, in at least one embodiment, the watermarked vision data is sent to the blockchain domain server 14, which then records the watermarked vision data. For example, the watermarked vision data can be included in a block on blockchain 104 or as a part of another blockchain. In another embodiment, the watermarked vision data can be stored in a database 102. The watermarked vision data can be stored along with a data representation of the embedded hash and/or other related information, such as an event identifier or a registration identifier. The watermarked vision data can be (also or alternatively) stored at database 84 of the remote facility 80.

Thus, the stored watermarked vision data is associated with a transaction (or entry) on the blockchain (e.g., blockchain 104). This transaction on the blockchain includes the embedded hash(es) (or information from which the embedded hash(es) can be derived) and, therefore, the transaction on the blockchain can be used to validate or verify the authenticity of the watermarked vision data through comparing the embedded hash(es) with the hash(es) of the transaction (i.e., the hash(es) stored on the blockchain). In this way, at least in some embodiments, the embedded hash(es) of the watermarked vision data can be used to cross-reference and validate the vision data (e.g., image data) with certain vehicle registrations that are recorded on the blockchain. The method 300 then ends.

Figure 4:
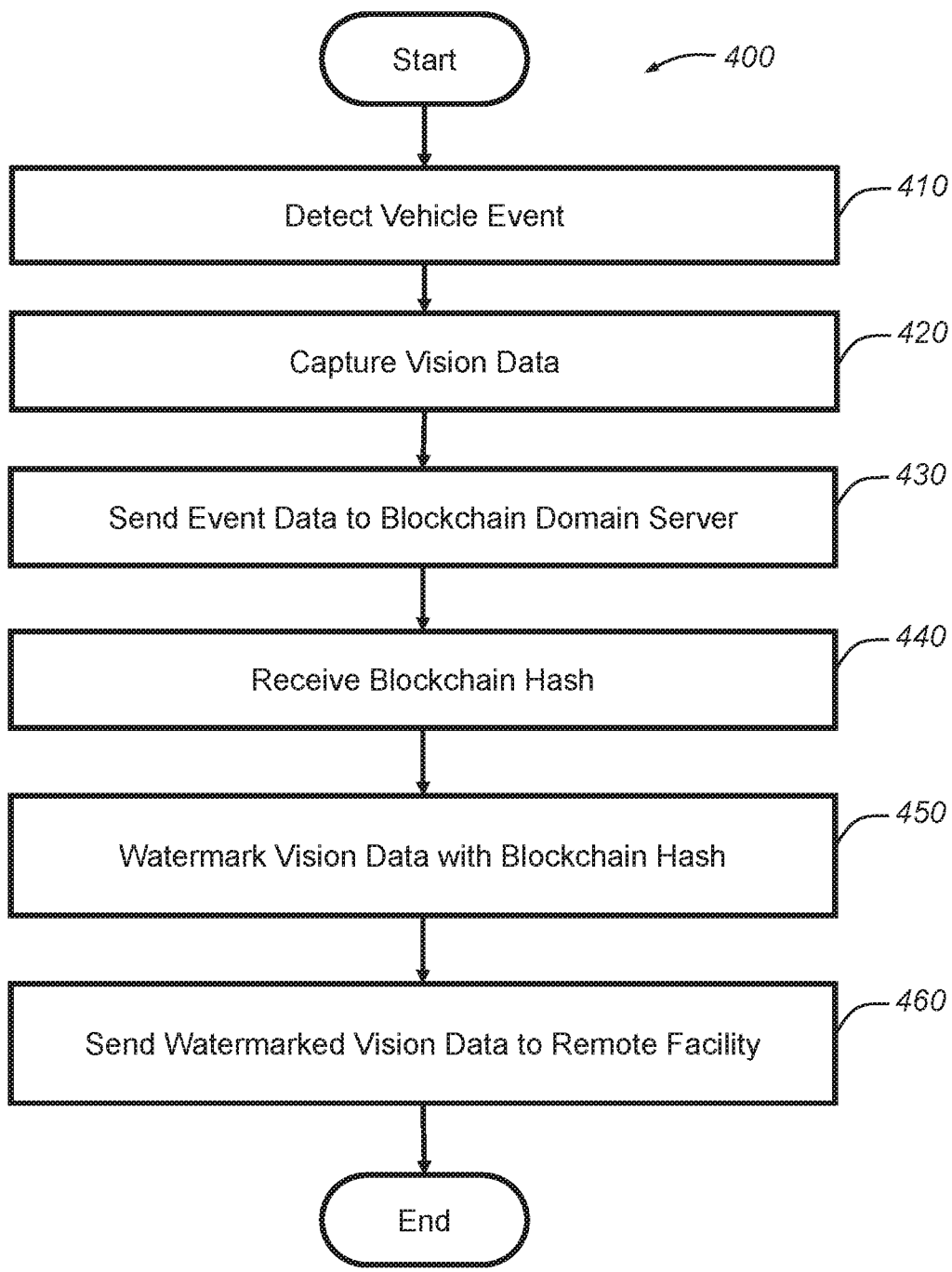
FIG. 4 is a flowchart of another embodiment of a method of producing vision data that is embedded with a blockchain hash stored on a blockchain.

With reference to FIG. 4, there is shown an embodiment of a method 400 of producing vision data that is embedded with a blockchain hash stored on a blockchain. In at least one embodiment, the method 400 is carried out by the vehicle 12. Although the steps of the method 400 are described as being carried out in a particular order, it is hereby contemplated that the steps of the method 400 can be carried out in any suitable or technically feasible order as will be appreciated by those skilled in the art.

In step 410, the vehicle detects the occurrence of a vehicle event. A plurality of vehicle events can be predefined by one or more conditions pertaining to vehicle states which can include, for example, an environmental vehicle state. In one embodiment, the current vehicle state can be determined through evaluation of one or more sensor readings from one or more onboard vehicle sensors, such as those discussed above. Moreover, in some embodiments, the vehicle state can be (at least partly) based on environmental information and/or information received from other external devices (e.g., remote facility 80, blockchain domain server 14, other vehicles). The vehicle 12 detects the occurrence of a vehicle event when the vehicle 12 determines that the current vehicle state matches or corresponds to a predefined vehicle event state. In some instances, the vehicle 12 can simultaneously detect the occurrence of a plurality of vehicle events. The method 400 continues to step 420.

In step 420, the vehicle captures vision data. In one embodiment, the vehicle 12 captures vision data in response to the detection of the vehicle event. In other embodiments, the vehicle 12 is already capturing vision data when (and prior to) the detection of the vehicle event. In a particular embodiment where the vehicle 12 is already capturing vision data when (and prior to) the detection of the vehicle event, the vehicle 12 can then determine to store and/or retain certain captured vision data in response to the detection of the vehicle event. For example, in one embodiment, the vehicle 12 captures image data (or other vision data) prior to the detected vehicle event, but only keeps this captured image data (or other vision data) in memory for a predetermined amount of time (e.g., five minutes), after which the image data is deleted so as to free up space of the memory device. However, after the detection of the vehicle event, the vehicle 12 can determine to retain this temporarily stored image data (or other vision data) and other image data (or other vision data) that is to be captured after the detection of the vehicle event. The method 400 continues to step 430.

In step 430, the vehicle sends event data to the blockchain domain server. In one embodiment, once the vehicle detects the occurrence of a vehicle event, the vehicle 12 can generate a vehicle event report message that includes event data. The vehicle event data can include vehicle state information, an event type, registration information (e.g., one or more hashes, the session information), at least one timestamp (or other time indicator) (e.g., time of the detected vehicle event, time of generating the vehicle event report), vehicle identification information (e.g., vision sensor unique identifiers (MAC addresses), VIN of the vehicle), and/or various other information. The vehicle state information can include vehicle location information (e.g., the vehicle's location, trajectory, projected/estimated route or path, previous location information), vehicle operation information (e.g., ignition status, gear status, wheel speed, engine temperature, steering wheel angle, odometer reading, engine speed), other vehicle information (e.g., number and/or identity of passengers), and environmental information (e.g., traffic conditions, other nearby vehicles (including their identity that can be determined, for example, via vehicle-to-vehicle (V2V) communications), signage, presence of objects detected via image recognition techniques, other information pertaining to captured image data or other vision data).

In one embodiment, the vehicle event report message (and/or the event data itself) can include vision-related data that is captured at or around a time of the event, such as a period of time starting prior to the event. This vision-related data can be at least a part of image data (or other vision data) that is captured by one or more vision sensors at the vehicle 12. Or, the vision-related data can include other data that is related to the vision data, such as metadata of the captured vision data. In another embodiment, the vision-related data can be data representing a watermark that is embedded within the image data, such as through use of a watermarking algorithm. The data represented in the watermark can be included in the vehicle event report message, which can be sent to the blockchain domain server 14. The blockchain domain server 14 can include this vision-related data within an event-specific transaction that is recorded on the blockchain. The blockchain hash can then be generated using this vision-related data. The method 400 then continues to step 440.

In step 440, the vehicle receives a blockchain hash. In one embodiment, the blockchain hash is an event-specific hash. For example, once the blockchain domain server 14 receives the vehicle event report message, the blockchain domain server 14 can generate an event-specific transaction to be included in a block or may generate a new block to be added to the blockchain 104; in the latter case, a block is generated for each event-specific transaction. As a part of adding this block (that includes the event-specific transaction) to the blockchain, an event-specific hash is generated based on the block or at least some vehicle information included in the block. The event-specific hash is then sent to the vehicle 12, which can store the hash in memory 38 (or other memory) and/or distribute the hash to one or more VSMs. The method 400 continues to step 450.

In step 450, the captured vision data is embedded with the blockchain hash. In one embodiment, the captured vision data can be the vision data that was captured in response to the capture command, and/or the data that was retained in response to the capture command. In many embodiments, this captured vision data exists in an uncompressed or "raw" state before the compression of step 450 is carried out. The hash can be included in the captured vision data using a watermarking technique, such as those discussed above. In one embodiment, this watermarking technique can be carried out as a part of compressing the raw vision data into compressed vision data. In other embodiments, the captured vision data can be compressed before step 450 and, during step 450, the one or more hashes are embedded in the compressed vision data using the one or more watermarking or steganography techniques (or other watermarking techniques). Any of those other watermarking techniques described above, such as with respect to step 340 (FIG. 3), can be used as well. The method 400 continues to step 460.

In step 460, the watermarked vision data is sent to the remote facility. In one embodiment, the watermarked vision data is sent to the remote facility via wireless carrier system 70 and land network 76 directly—that is, the watermarked vision data is sent to the remote facility without being communicated through the blockchain domain server 14. In another embodiment, the watermarked vision data is sent to the remote facility via the blockchain domain server 14. As mentioned above, the watermarked vision data can be verified as having been captured in response to (or in association with) a particular vehicle event and/or from a particular vehicle (or vision sensor). Also, as mentioned above, various information, such as vehicle state information, can be stored on the blockchain, which can be used to verify certain aspects of the watermarked vision data, such as the vehicle's location, the time of the event or vision data capture, or other vehicle state or environmental information. Thus, the stored watermarked vision data is associated with an event-specific transaction (or entry) on the blockchain (e.g., blockchain 104). This event-specific transaction on the blockchain includes the embedded hash(es) (or information from which the embedded hash(es) can be derived) and the event-specific data that was received from the vehicle (along with a timestamp, for example). Therefore, the transaction on the blockchain can be used to validate or verify the authenticity of the watermarked vision data through comparing the embedded hash(es) with the hash(es) of the event-specific transaction (i.e., the hash(es) stored on the blockchain).

In one embodiment, the method 300, the method 400, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers (or VSMs), such as on multiple computers (or VSMs) that are in communication with one another.

The computer program(s) can be embodied on computer readable media (e.g., memory of one or more servers at the remote facility 80, memory 38 of the wireless communications device 30, memory of one or more vision sensors 42-46, memory 96 of the blockchain domain server 14), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of producing vision data that is embedded with a blockchain hash stored on a blockchain, the method comprising:

detecting a vehicle event at a vehicle using vehicle electronics included in the vehicle;

sending a vehicle event report message to a blockchain domain server in response to the detected vehicle event, the vehicle event report message including information pertaining to the detected vehicle event, and wherein the blockchain domain server is configured to record the detected vehicle event as a part of a blockchain based on the vehicle event report message;

receiving a blockchain hash at the vehicle from the blockchain domain server; and embedding the blockchain hash within vision data at the vehicle using the vehicle electronics, wherein the vision data is captured by a vision sensor that is mounted on the vehicle and included as a part of the vehicle electronics.

2. The method of claim 1, wherein the blockchain hash is an event-specific hash that is generated at the blockchain domain server as a part of the recording of the detected vehicle event at the blockchain domain server, and wherein the blockchain hash is received in response to the recording of the detected vehicle event at the blockchain domain server.

3. The method of claim 1, further comprising the step of sending the vision data with the embedded blockchain hash to a remote facility that is separate from the blockchain domain server.

4. The method of claim 1, wherein the vehicle event report message includes a vehicle location, a timestamp, and at least one other vehicle state datum, and wherein the vehicle location, the timestamp, and the at least one other vehicle state datum correspond to a time of the detected vehicle event.

5. The method of claim 1, further comprising the step of registering the vehicle with a blockchain domain server in response to the vehicle approaching or entering a geographical domain associated with the blockchain domain server.

6. The method of claim 1, wherein the vision data is image data, and wherein the blockchain hash is applied as a watermark to the image data.

7. The method of claim 6, wherein the blockchain hash is embedded in the image data using a reversible steganography technique such that all or substantially all data represented in the image data before the watermarking is retained after the image data is watermarked with the blockchain hash.

8. The method of claim 6, wherein the image data is captured by an image sensor included as a part of the vehicle electronics, and wherein the image sensor applies the blockchain hash to the image data while encoding the image data using a codec.

9. The method of claim 1, wherein the blockchain hash is a hash that is generated by carrying out a hashing function using information included in a block of the blockchain as an input.

10. The method of claim 9, wherein the blockchain domain server is configured to generate the block of the blockchain using event data received in the vehicle event report message.

11. A method of producing vision data that is embedded with a blockchain hash stored on a blockchain, the method comprising:

registering a vehicle with a blockchain domain server in response to the vehicle approaching or entering a geographical domain associated with the blockchain domain server;

receiving a blockchain hash at the vehicle from the blockchain domain server, wherein the blockchain domain server is configured to record information received from the vehicle in a blockchain, and wherein the blockchain hash is generated by carrying out a hashing function using information included in a block to be added to the blockchain as an input; and embedding the blockchain hash in vision data captured at the vehicle using the vehicle electronics, wherein the vision data is captured by a vision sensor that is mounted on the vehicle and included as a part of the vehicle electronics.

12. The method of claim 11, wherein the blockchain hash is a registration hash that is associated with the registration of the vehicle and that is generated at the time of registering the vehicle.

13. The method of claim 12, wherein the blockchain domain server is configured to record vehicle registration information received from the vehicle in the blockchain, and wherein the vehicle registration information is sent by the vehicle as a part of the registering step.

14. The method of claim 11, wherein the registering step includes establishing a wireless communication connection between the vehicle and the blockchain domain server.

15. The method of claim 14, wherein the wireless communication connection is established using cellular communications.

16. The method of claim 11, further comprising the step of detecting a vehicle event at the vehicle using vehicle electronics included in the vehicle, wherein the vision data is image data and the vision sensor is an image sensor, and wherein the embedding step comprises watermarking each of a number of frames of the image data with the blockchain hash and storing the frames as a video clip in response to detecting the vehicle event.

17. A vehicle electronics system, comprising:

a wireless communications device that includes wireless communication circuitry, a processor, and memory; and a vision sensor that includes a processor and memory;

wherein the vehicle electronics system includes computer instructions that, when executed by one or more processors, cause the vehicle electronics system to:

detect a vehicle event at a vehicle that includes the vehicle electronics system;

send a vehicle event report message to a blockchain domain server using the wireless communication circuitry, the vehicle event report message including information pertaining to the detected vehicle event, and wherein the blockchain domain server is configured to record the detected vehicle event based on the vehicle event report message as a part of a blockchain;

receive a blockchain hash at the vehicle from the blockchain domain server using the wireless communication circuitry; and embed the blockchain hash within vision data at the vehicle using the vision sensor.

18. The vehicle electronics system of claim 17, wherein at least some of the computer instructions are executed by a vehicle system module (VSM) of the vehicle other than the vision sensor and the wireless communications device.

19. The vehicle electronics system of claim 18, wherein the vision sensor is a camera that is configured to capture image data.

20. The vehicle electronics system of claim 17, further comprising a global navigation satellite system (GNSS) that is configured to determine a vehicle location of the vehicle based on receiving a plurality of GNSS signals from a plurality of GNSS satellites, wherein the vehicle location is included as a part of the vehicle event report message.

* * * * *